Sept. 30, 1952  J. A. MANDERS  2,612,383

TOWING DEVICE

Filed Sept. 21, 1950

INVENTOR
JOHN A. MANDERS
BY J. H. Braddock
ATTORNEY

Patented Sept. 30, 1952

2,612,383

UNITED STATES PATENT OFFICE 2,612,383

TOWING DEVICE

John A. Manders, Minneapolis, Minn.

Application September 21, 1950, Serial No. 185,987

1 Claim. (Cl. 280—33.14)

This invention has relation to a new and improved towing device for vehicles including a first gripper for detachable connection to a bumper of a vehicle to be propelled, a second gripper for detachable connection to a bumper of a propelling vehicle, and a cable or so-called tow chain connected between said first and second grippers.

In the accompanying drawing forming a part of this specification,

Figure 1:
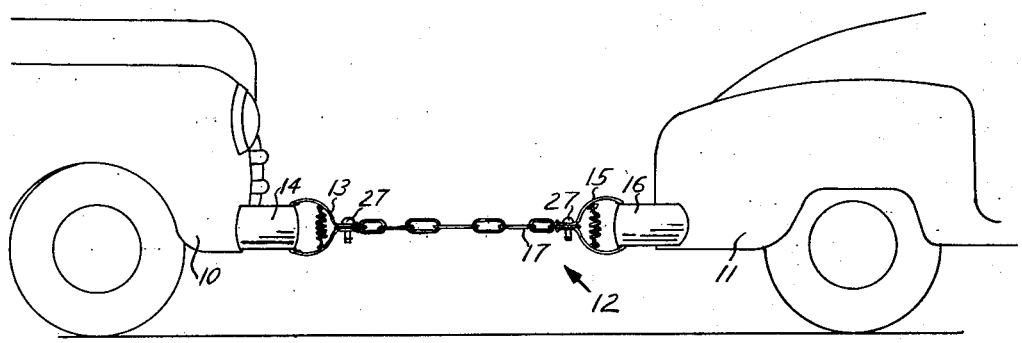
Fig. 1 is a side elevational view of a towing device including the features and characteristics of the invention as when applied to use.
Figure 3:
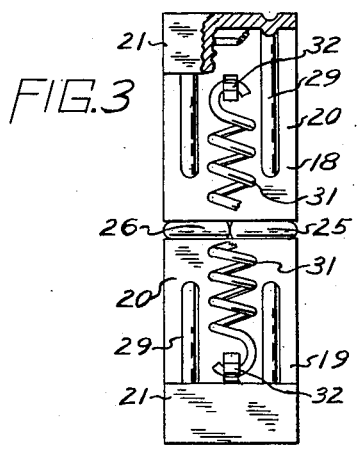
Fig. 3 is an end elevational view, partially in section and partially broken away, of the gripper disclosed in Fig. 2 as it would appear from the left with the bumper removed.
Figure 2:
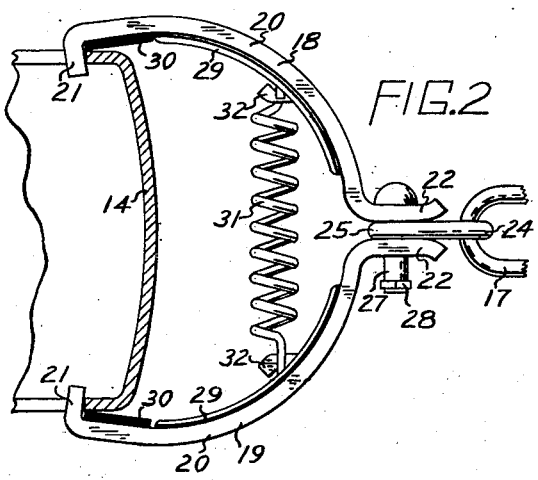
Fig. 2 is an enlarged elevational view of either of a pair of grippers of the towing device of Fig. 1.
Figure 5:
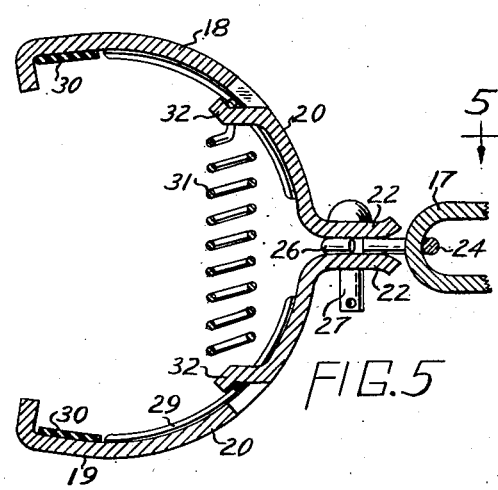
Fig. 5 is a sectional view, taken as on line 5—5 in Fig. 4.
Figure 4:
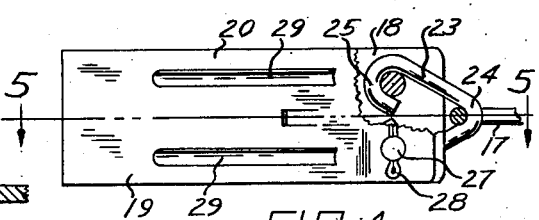
Fig. 4 is a bottom plan view, partially in section and partially broken away, of the disclosure of Fig. 2.

With respect to Fig. 1 of the drawing and the numerals of reference thereon, 10 denotes a vehicle to be propelled, 11 indicates a propelling vehicle, and 12 represents a towing device made according to the invention. Said towing device is constituted as a first gripper 13 detachably connected to a bumper 14 of said vehicle 10 to be propelled, a second gripper 15 detachably connected to a bumper 16 of said propelling vehicle, and a cable or so-called tow chain 17 connected between said first and second grippers 13 and 15.

The first and second grippers 13 and 15 are duplicates in the disclosure as made. That is, each of said first and second grippers is of construction as disclosed in Figs. 2 to 5, inclusive, and now to be set forth.

Complemental grip elements of each of the first and second grippers 13 and 15 are designated 18 and 19, respectively. Each of the grip elements 18 and 19 consists of rigid material, desirably metal.

The grip elements 18 and 19 of each gripper are duplicates. Each grip element is constituted as a curvilinear intermediate length 20, a hook portion 21 at one end of, substantially in perpendicular relation to and extending from a concave side of said curvilinear length, and an attachment portion 22 at the other end of, substantially in perpendicular relation to and extending from a convex side of the curvilinear length. When the complemental grip elements of each gripper are interconnected, in the manner as hereinafter described, the curvilinear intermediate lengths 20, 20 are in the same plane transversely of the corresponding gripper, as are also the hook portions 21, 21 and the attachment portions 22, 22, respectively. Also, said hook portions 21, 21 are in opposed, facing relation and said attachment portions 22, 22 are in adjacent, parallel relation, as clearly disclosed in Figs. 2 and 5 of the drawings, when the complemental grip elements of each gripper are interconnected.

A special link 23 of each gripper interconnects the corresponding gripper with the adjacent endmost common link of the cable or tow chain 17, and each special link is of general V-shape. In the instance of each gripper, a bight 24 of the special link, at a first apex thereof, is provided by bending the midlength of a piece of wire, an interiorly facing first hook 25 of said special link, at a second apex thereof, is provided by shaping or bending one end portion of the piece of wire interiorly, and an interiorly facing second hook 26 of the special link, at the third apex thereof, is provided by shaping or bending the other end portion of said piece of wire interiorly. The interiorly facing first and second hooks 25 and 26 are in adjacent relation, and there is a clearance between said first and second hooks, at the end of each special link opposite its bight 24, to permit assembly of the adjacent endmost common link of the cable or tow chain 17 with said bight 24. The manner of assembly of each special link with said cable or tow chain will be apparent from the disclosure of the drawing.

The first and second hooks 25 and 26 of each special link are situated in flatwise fashion between the attachment portions 22, 22 of the corresponding gripper, 13 or 15, as the case may be, and the bight 24 of each special link is situated beyond the free ends of said attachment portions.

Each special link is connected to and between the attachment portions 22, 22 of the grip elements of the corresponding gripper through the instrumentality of a pair of rivets 27, in alined relation transversely of said corresponding gripper, which pass through said attachment portions and are also situated in said first and second hooks, and cotter pins 28 in said rivets preclude the possibility of their accidental removal. The construction and arrangement are such that the rivets permit the grip elements of the corresponding gripper to have relative swinging movement toward and away from each other in a single plane and at the same time retain said grip elements in alinement longitudinally of said corresponding gripper.

Portions of the curvilinear intermediate lengths 20 of the grip elements adjacent the attachment portions 22 are struck interiorly to provide longitudinally extending strengthening ribs 29, and rubber pads cemented to interior surfaces of portions of said curvilinear intermediate lengths adjacent the hook portions 21 are indicated 30.

A tension coil spring 31 of each gripper resiliently connects the grip elements thereof. The opposite ends of each tension coil spring are connected to lugs 32 inwardly struck from the curvilinear lengths 20 of the grip elements of the corresponding gripper. As disclosed, the lugs 32 are situated between the strengthening ribs 29 in alined relation transversely of the corresponding gripper and in somewhat closer relation to the attachment portions 22 than to the hook portions 21.

The manner in which the towing device is put to use will be apparent. The grip elements of the grippers will be manually swung apart against resiliency of the tension coil springs 31, the hook portions 21 of one of said grippers will be fitted over and to the bumper of a vehicle to be propelled and the hook portions 21 of the other gripper will be fitted over and to the bumper of a propelling vehicle. The construction and arrangement will be such that the tension coil springs 31 will retain the grip elements upon the bumpers, in the manner as very clearly disclosed in Figs. 1 and 2, with the rubber pads 30 in proximate relation to upper and lower surfaces of said bumpers and said hook portions 21 back of and in horizontal alinement with the interior surfaces of the bumpers. It will be evident that the grippers can be readily and easily removed from the bumpers merely by manually swinging the grip elements apart against resilient action of the tension coil springs.

What is claimed is:

A gripper for detachably connecting a tow chain to a vehicle bumper, comprising complemental grip elements each constituted as a length of rigid material having a hook portion and an attachment portion at opposite ends, respectively, thereof, a special link providing first and second hooks situated between and in proximate relation to the attachment portions of said grip elements and a bight situated at a side of said attachment portions opposite the lengths of the grip elements assembled with a link of said tow chain, rivets in said attachment portions and said first and second hooks securing the attachment portions to each other and to said special link, with the hook portions of said grip elements extending interiorly and disposed in opposed, facing, spaced relation, for limited swinging movement of the grip elements toward and away from each other, and a tension spring interconnecting intermediate portions of said lengths of said grip elements.

JOHN A. MANDERS.

REFERENCES CITED

The following references are of record in the file of this patent:

UNITED STATES PATENTS

| Number    | Name         | Date           |
|-----------|--------------|----------------|
| 2,157,612 | Kirk         | May 9, 1939    |
| 2,196,117 | Lange        | Apr. 2, 1940   |
| 2,435,813 | Williams     | Feb. 10, 1948  |
| 2,494,526 | Tungett et al. | Jan. 10, 1950 |
| 2,568,425 | Weeks et al. | Sept. 18, 1951 |